United States Patent
Werve et al.

(10) Patent No.: US 6,934,277 B1
(45) Date of Patent: *Aug. 23, 2005

(54) INTERNET WEB SITE WITH AUDIO INTERCONNECT AND AUTOMATIC CALL DISTRIBUTOR

(75) Inventors: Timothy P. Werve, Geneva, IL (US); Laird C. Williams, St. Charles, IL (US); Michael C. Hollatz, Huntley, IL (US)

(73) Assignee: Rockwell Electronic Commerce Technologies, LLC, Wood Dale, IL (US)

( * ) Notice: This patent issued on a continued prosecution application filed under 37 CFR 1.53(d), and is subject to the twenty year patent term provisions of 35 U.S.C. 154 (a)(2).

Subject to any disclaimer, the term of this patent is extended or adjusted under 35 U.S.C. 154(b) by 0 days.

(21) Appl. No.: 09/032,551

(22) Filed: Feb. 26, 1998

(51) Int. Cl.$^7$ .......................... H04L 12/66; H04M 3/00
(52) U.S. Cl. ................ 370/352; 370/270; 379/265.01; 379/265.11; 379/265.12; 379/266.01
(58) Field of Search .............................. 370/400, 401, 370/402, 403, 351–352, 353, 354, 355, 356, 370/522, 524, 389, 392, 264, 270; 379/93.01–93.08, 379/93.14, 90.01, 67, 88, 89, 201, 202, 203, 379/216, 265, 265.01–266.01; 395/200.48, 395/186; 345/727–729; 709/200–205

(56) References Cited

U.S. PATENT DOCUMENTS

| | | | |
|---|---|---|---|
| 5,140,611 A | 8/1992 | Jones et al. ..................... 375/7 |
| 5,268,903 A | 12/1993 | Jones et al. ............... 370/110.1 |
| 5,335,269 A | 8/1994 | Steinlicht ..................... 379/266 |
| 5,384,841 A | 1/1995 | Adams et al. ............... 379/266 |
| 5,465,286 A * | 11/1995 | Clare et al. .................. 379/265 |
| 5,469,504 A | 11/1995 | Blaha .......................... 379/265 |
| 5,500,891 A | 3/1996 | Harrington et al. ......... 379/265 |
| 5,657,383 A * | 8/1997 | Gerber et al. ............... 379/266 |
| 5,721,770 A * | 2/1998 | Kohler ........................ 379/266 |
| 5,724,412 A * | 3/1998 | Srinivasan ............... 379/93.23 |
| 5,740,240 A * | 4/1998 | Jolissaint ..................... 379/265 |
| 5,764,736 A * | 6/1998 | Shachar et al. .......... 379/93.09 |
| 5,778,181 A * | 7/1998 | Hidary et al. .......... 395/200.48 |
| 5,793,861 A * | 8/1998 | Haigh ......................... 379/266 |
| 5,806,043 A * | 9/1998 | Toader ......................... 705/14 |
| 5,815,657 A | 9/1998 | Williams et al. ............ 395/148 |
| 5,825,869 A * | 10/1998 | Brooks et al. ............... 379/265 |
| 5,838,682 A * | 11/1998 | Dekelbaum et al. ........ 370/401 |
| 5,862,202 A * | 1/1999 | Bashoura et al. ........... 370/352 |
| 5,884,032 A * | 3/1999 | Bateman et al. ............ 370/356 |
| 5,923,736 A * | 7/1999 | Shachar ................... 379/90.01 |
| 5,958,014 A * | 9/1999 | Cave ........................ 379/93.12 |
| 5,999,965 A * | 12/1999 | Kelly .......................... 709/202 |

(Continued)

Primary Examiner—Steven Nguyen
(74) Attorney, Agent, or Firm—Welsh & Katz, Ltd.

(57) ABSTRACT

An apparatus and method of establishing an audio call path between an Internet user accessing a web site and an agent of the web site is provided. The method includes the steps of proving a web site with a plurality of audio access icons and a plurality of agent groups and associating an agent group of the plurality of agent groups with each audio-access icon of the web site. The method further includes establishing a voice path between the user and an agent of the associated agent group based upon activation of a audio-access icon by the user.

55 Claims, 1 Drawing Sheet

U.S. PATENT DOCUMENTS

| | | | |
|---|---|---|---|
| 6,021,428 A * | 2/2000 | Miloslavsky | 709/206 |
| 6,046,762 A * | 4/2000 | Sonesh et al. | 379/265 |
| 6,064,730 A * | 5/2000 | Ginsberg | 379/93.17 |
| 6,070,185 A * | 5/2000 | Anupam | 709/204 |
| 6,094,673 A * | 7/2000 | Dilip | 709/202 |
| 6,130,933 A * | 10/2000 | Miloslavsky | 379/93.14 |
| 6,188,673 B1 * | 2/2001 | Bauer et al. | 370/352 |
| 6,192,050 B1 * | 2/2001 | Stovall | 370/352 |
| 6,295,551 B1 * | 9/2001 | Roberts et al. | 709/205 |
| 6,366,575 B1 * | 4/2002 | Barkan et al. | 370/352 |
| 6,625,139 B2 * | 9/2003 | Miloslavsky et al. | 370/352 |

* cited by examiner

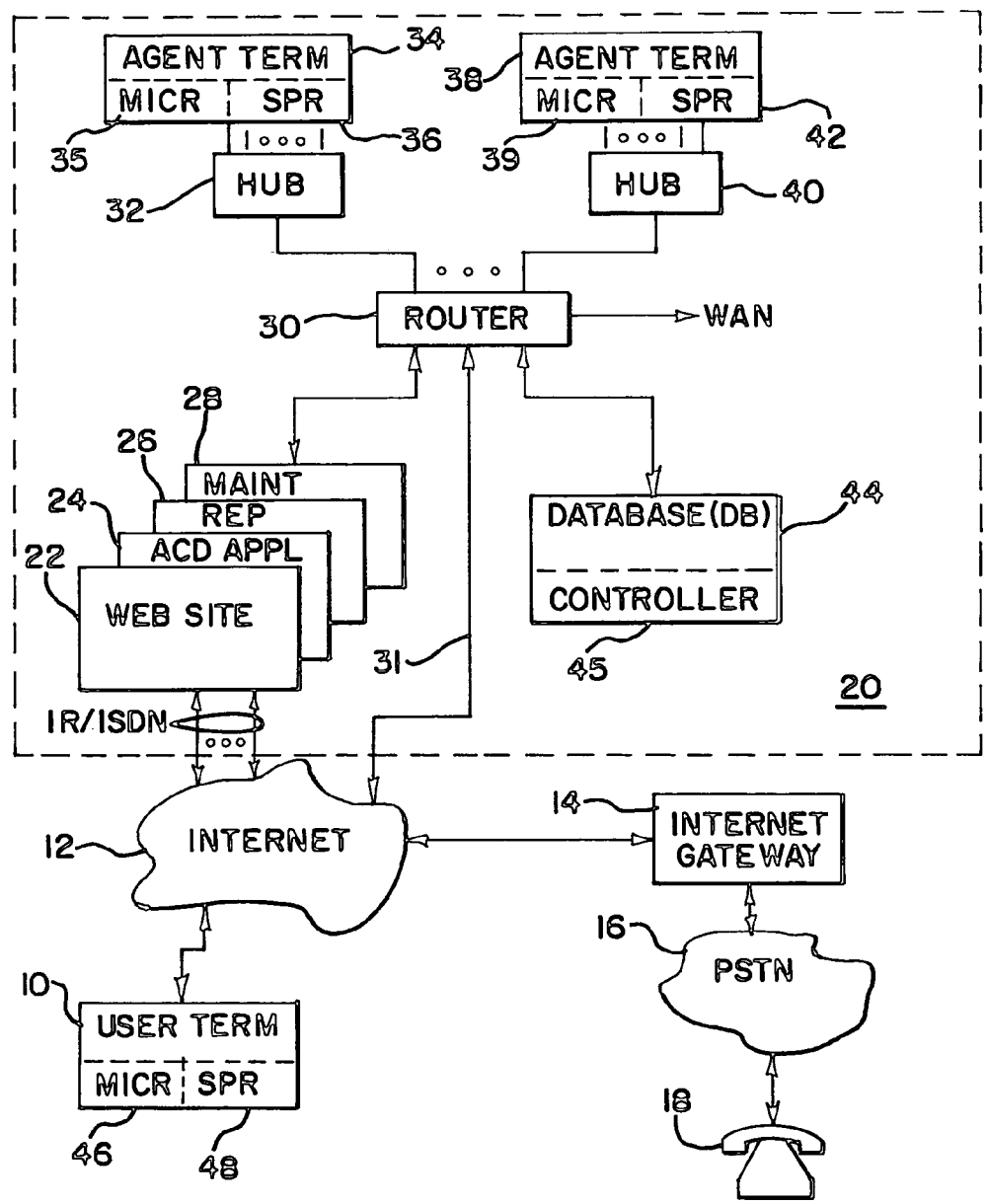
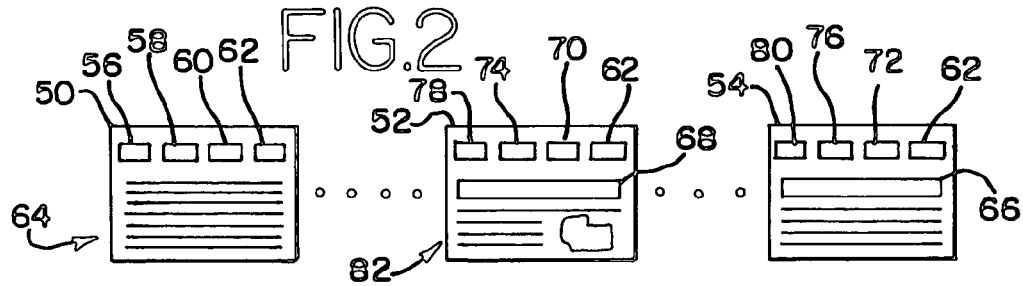

INTERNET WEB SITE WITH AUDIO INTERCONNECT AND AUTOMATIC CALL DISTRIBUTOR

FIELD OF THE INVENTION

The field of the invention relates to the Internet and more particularly to audio interconnects through the Internet.

BACKGROUND OF THE INVENTION

Automatic call distribution systems are known. Such systems are typically used in an organizational context as a means of distributing telephone calls among a group of agents of the organization.

Often the organization disseminates a single telephone number to its customers and to the public in general as a means of contacting the organization. As calls are directed to the organization from the public switch telephone network (PSTN), the automatic call distribution system directs the calls to its agents based upon some algorithm, typically based upon availability. For example, where all agents are considered equal, the ACD may distribute the calls based upon which agent position (telephone) has been idle the longest. Alternatively, call distribution may be based upon a level of skill of an agent or by the source of the call.

In order to distribute incoming calls from the PSTN to the available agents, the interaction of a controlling computer with a switching fabric of the ACD becomes essential. Often a connection to a local PSTN is in the form of a number of trunk connections. Each of the trunk connections is monitored by the controller for incoming calls. Where a call is detected, the controller searches for and selects an idle agent. Upon selecting an agent, the controller instructs the switch to form a connection between the incoming trunk and selected agent.

In more complicated systems, the organization may use a number of telephone numbers to identify different individuals and functions within the organization. Each telephone number may be assigned to a particular incoming trunk or group of incoming trunk lines. As such, the controller may be required to recognize a call target based upon an identity of an incoming trunk line and route the call accordingly.

In other systems, the ACD of an organization may receive calls directed to different call targets over the same trunk lines. In such a case, the call target may be identified to the ACD by a pulse code modulated (PCM) signal transferred from the PSTN to the controller of the ACD by a dialed number identification service (DNIS) operating from within the PSTN.

In systems associated with service organizations, where many calls are received and handled by many agents, it may be important for an agent to have ready access to customer files. In such a situation, a database is maintained of existing customers. Customer records may be displayed on agent terminals as the agents converse with specific customers. In some cases, the customer may be identified to the database for display of records on the terminal by the agent entering a customer identifier into a keyboard associated with the terminal. Alternatively, the controller of the ACD may transfer an identifier of the customer to the database based upon an automatic number identification (ANI) facility, operating from within the PSTN.

Where ANI is used, the controller of the ACD receives the ANI digits (identifying the caller via the caller's telephone number) at the same time the call arrives from the PSTN. Upon selecting an agent, the controller may transfer the call to a queue for the selected agent or directly to the selected agent. At the same time that the call is delivered to the agent, the controller sends an identifier of the selected agent and ANI number of the customer to a controller of the database (the host). The host, in turn, displays the customer records via a computer monitor of the selected agent at the same time the call is delivered.

As a further feature, calls may be transferred among agents. Where a first agent finds that he or she cannot help a particular customer, the agent may activate a key on a keyboard of the agent and enter an identity of another agent or agent group that may be better able to help the customer. The controller of the ACD may immediately connect the call to the newly identified agent, or may place the call in a queue until the identified agent becomes available.

In either case, the controller transfers a message to the host identifying the previous and newly identified agent. Since the host knows the identity of the customer displayed at the terminal of the previous agent, the host may now display those same customer records at the terminal of the newly selected agent.

Where a call is placed in a queue, the ACD controller may monitor a total time that the call has been in the queue. Where the time exceeds a threshold value, the controller may transfer (overflow) the call to a newly selected agent at another less heavily loaded ACD (overflow ACD) within the same organization. The controller of the transferring ACD transfers DNIS and ANI information as well as a call sequence number assigned by the transferring ACD to the overflow ACD. The overflow ACD, upon receiving the call, transfers the information to the host including an identifier that the call is an overflow call.

With regard to geographical layout of an ACD system, often the switches of the ACD system are relatively widely distributed with small groups of agents assigned to each switch. Further, the switches may be in different time zones which offers the opportunity of load sharing where agents may be used to share an incoming call load of a particular region based upon time of day or other factors.

While ACDs and agents of the organization are effective sales tools, an agent's time is often spent repeating the same message to different customers and entering the same types information into a organizational database from different customers. To complement the efforts of sales agents and reduce the time an agent may spend explaining a product, most organizations invest heavily in printed sales literature and marketing brochures.

As an alternative to printed matter, some organizations have begun providing web sites on the Internet, offering a wide variety of information. For many of those organizations, the Internet has become an effective marketing tool. Many organizations now offer web sites providing customers with a wide variety of product information. However, if a customer has a question, he must still call a customer service representative (or send E-mail). Accordingly, a need exists for a method of providing interactive sales support to customers through web sites of the Internet.

BRIEF DESCRIPTION OF THE DRAWINGS

FIG. 1 is a block diagram of an Internet system and an Internet web site and call distributor in accordance with an embodiment of the invention; and FIG. 2 depicts a series of web pages of an embodiment of the web site of FIG. 1.

SUMMARY OF THE INVENTION

An apparatus and method of establishing an audio call path between an Internet user accessing a web site and an agent of the web site is provided. The method includes the steps of proving a web site with a plurality of audio access icons and a plurality of agent groups and associating an agent group of the plurality of agent groups with each audio-access icon of the web site. The method further includes establishing a voice path between the user and an agent of the associated agent group based upon activation of a audio-access icon by the user.

DETAILED DESCRIPTION OF AN EMBODIMENT

FIG. 1 is a block diagram of an Internet automatic call distributor (IACD) 20 of an organization, generally, in accordance with an illustrated embodiment of the invention. Under the embodiment, the IACD 20 provides Internet information through a web site 22 to any of a number of users (not shown) through a corresponding number of user terminals (e.g., terminal 10). The web site 22 also functions to set up voice connections between users (e.g., at terminal 10) and selected agent terminals 34, 38.

To support web searching and the receipt of audio/visual information, the user terminal 10 may be equipped with an appropriate web browser from a web browser supplier (e.g., America OnLine, Inc. (AOL)). To support voice traffic through the Internet between the user terminal 10 and the agent terminals 34, 38, both the agent terminals 34, 38 and user terminals 10 are provided with one or more internet protocol (IP) sockets (e.g., WebPhone from NetSpeak Corp., InterNet Phone from Vocal Tec, Inc., etc.) providing IP telephony.

The IACD 20 may operate on a bridge or local area network (LAN) distributing Internet user calls among agents 34, 38 under the control of an ACD application 24. The ACD application 24 determines an identity of an agent 34, 38 to which a call is to be distributed. A router 30 functions to deliver the call to the appropriate agent 34, 38 through a hub 32, 40.

The router 30 and hubs 32, 40 operate conventionally. Upon receiving a packet of information, the router examines a packet header to determine a destination of the packet. Upon recovering the packet header, the router 30 upon reference to a look-up table may determine a route necessary to deliver the packet to the proper destination. The router 30 then routes the packet accordingly.

Each agent terminal 34, 38 functions as a web site on the Internet. Forwarding of the user from the original web site 22 to an agent 34, 38 is accomplished by regarding a help request from the user as an additional search term. The context of the help request causes an ACD application of the original web site 22 to route the user to a particular agent 34, 38.

Information about a user may be delivered to the terminal 34, 38 concurrently with the call. It should be understood that the term "call", as used herein, is not meant in its usual telephony sense to imply a continuous end-to-end connection. As used herein, call simply means that each party to the call has in its possession the Internet address of the other party to the call and is using that address to exchange audio information with the other party.

An agent may identify itself to the web site 22 at the beginning of a work shift by an appropriate sign-on message, including a personal identification number (PIN) of the agent. The terminal 34, 38 used by the agent sends the packet to the web site 22 announcing sign-on of the agent. The packet includes the LAN address 34, 38 of the agent and also the agent PIN. Upon receipt of the sign-on message, the web site 22 associates the previously known skill set of the agent with the PIN. When the web site 22 determines that a call should be assigned to the agent, the web site 22 retrieves the LAN address of the agent and routes the call to that address.

The web site 22 may be interconnected with the Internet through any of a number of hardwired integrated services digital network (ISDN) connections. The web site 22 while shown as a separate block on FIG. 1 may actually be made up of and include a number of software applications operating on a general purpose computer (e.g., an IBM PC). For example, the web site 22 may be supported by an automatic call distributor (ACD) 24, report generation software (REP) 26 and a number of maintenance and support applications (MAINT) 28.

Under the embodiment, the visual aspects of web site 22 perceived by the user (not shown) through the terminal 10 are conventional. A user may gain access to the web site 22 by accessing the Internet 12 through a computer 10 with the appropriate software and a subscription to the Internet through an Internet service provider (e.g., AOL). The user may do a word search or if he knows the Internet address of the organization may access the web site 22 directly.

Where the user does a word search, he may first access a search engine on the Internet (e.g., Yahoo, Web Crawler, etc.). After a search, an Internet address of the web site 22 may be returned as a search result.

Once the user accesses the web site 22, the user may arrive at a home page 50 (FIG. 2). On the home page 50, the user may find text 64 describing the organization and the organization's products. The user may also be presented with a number of softkeys 56, 58, 60, 62. Some of the softkeys (e.g., 56, 58, 60) may be labeled as directories to more detailed information of specific products or product lines. For example, activation of one of the keys (e.g., the first key 56 from the left) may lead to presentation of the second web page 52 to the user. Activation of another key 58 may lead to presentation of the third web page 54.

Other softkeys (e.g., 70, 72) may be provided as a means of collecting information from the user. For example the organization may be an airline and the web site 22 may be provided for the purchase of airline tickets. An interactive window 68 may be provided for entry of a flight destination.

To use the interactive window 68, the user may click on the window 68 with a mouse (not shown) of the terminal 10. Clicking on the window 68 may cause a cursor to appear in the window 68. The cursor may allow the user to enter a desired destination into the window 68. To complete the request, the user may click on another softkey 74 to request ticketing information about the entered destination.

In response, the WEB application 22 may return ticketing information in the same window 52 or similar window. The WEB application 22 may also open a file for the user in the database 44 based upon the Internet address of the terminal 10. The ticketing information returned to the user in the window 52 may include flight times and ticket pricing information. If a flight does not fly to the entered destination, the text 82 may provide alternate destinations. In response, the user may be asked to click on a particular flight to select the flight and click on another softkey 78 to select ticket purchase.

In response, the WEB application 22 may present the user with another screen 54, asking for a mode of payment. If the user selects a credit card, the user will be asked to identify the particular type of card and enter the credit card number through another window 66 to complete the transaction.

The user may select a particular type of card by pressing another softkey (e.g., 80). Activation of a particular softkey 80 may cause the cursor to appear in the window 66 along with text requesting entry of a credit card number. The user may enter his credit card number and complete the transaction by activation of another softkey 76. The user's file in the database 44 is updated accordingly.

At least one of the keys (e.g., 62) on at least some of the web pages 50, 52, 54 may be a help key labeled "Customer Service". The label "Customer Service may be provided as an indication that activation of the softkey will lead to direct access to, and a voice connection with an agent 34, 38 through the voice plug-ins of the Internet.

Upon activation of a Customer Service key, the WEB application 22 stores an identifier of the web page from which the Customer Service Key was activated in the user file in the database 44. The ACD application 24 then begins taking steps to determine the identity of the appropriate agent or agent group to connect to the user. For example, if the key 62 on the second screen 52 had been activated before selection of a destination, then the application 24 would know that the user has a question on flight destinations. On the other hand, if the user had clicked on the Service button 62 on the second screen 52 after entering a destination and after display of ticket price, then the application 24 would know that the user probably has a question on ticket pricing. If the user had clicked on the Service button 62 on the third screen 54, then the application 24 may surmise that the user has a question of credit card use.

Upon determining the type of problem to be addressed, the application 24 may turn to the problem of selecting an agent or agent group 34, 38 best able to address the problem. For instance, the ACD application 24 may determine from a skills list that a first agent 34 is best suited to answering the call from the user. However, the agent 34 may be occupied in servicing a prior call. Where the selected agent 34 is occupied with a prior call, the application 24 may place the request in a call queue until the agent 34 becomes available.

While the user is in the queue, the user terminal 10 may give visual indication to the user that the request is being processed. For instance, the terminal 10 may display the message "Please wait for the next available agent".

When the agent 34 becomes available, the application 24 transfers the user to the agent 34. Transfer of the user to the agent 34 may occur under either of two possible scenarios. First, the web site 22 may transfer the Internet address of agent 34, to the user terminal 10. Under this scenario, the user terminal 10 would then transmit an audio set-up message allowing the user terminal 10 to set up the voice connection.

Alternatively, the web site 22 may transfer the Internet address of the user terminal 10 to the selected agent 34. Sending the user address to the agent 34 would allow the agent 34 to defer set-up of the connection until the agent 34 has received any records of the user.

Upon transfer of the call to the agent 34, a home page of the user may appear on the agent's screen. A home page of the agent (or the organization, or customer service) may also appear on the user terminal 10. Alternatively, the web page displayed on the user terminal 10 may remain constant and be displayed at both terminals 10, 34, allowing the user to ask questions without being distracted by more information.

In addition to setting up the audio connection between the user and agent 34, the application 24 also transfers a file forwarding request to a controller 45 of the database 44, including the Internet address of the user along with an identifier of the selected agent 34. The database then locates the user file and transfers the collected information to the agent 34 in the form of a screen-pop. The screen-pop may occur over only a portion of the screen or may be presented in a flashing format to allow the agent to clearly see the information presented for the benefit of the user.

The screen pop may include any information collected from the user and also an identifier of the web page where the problem occurred. Transferring information to the agent 34 regarding where the problem occurred allows the agent 34 to view the same web page viewed by the user when the problem occurred. Further, the transfer of the collected information to the agent 34 allows the agent 34 to complete the transaction directly or to answer the user's question and allow the user to hit the "back" key on his Internet screen and return to the previous page 22.

In another embodiment of the invention, the ACD application 24 maintains records on a time that a user has been in a queue waiting for the next available agent. If the time exceeds a threshold, the ACD application 24 may transfer the call to another queue of another agent or agent group 38.

In another embodiment, where an agent (e.g., the first agent 34) finds that he cannot adequately help the user, the agent 34 may enter an identifier of another agent 38 and activate a transfer key. The result may be a transfer of the user to a second agent 38.

In another illustrated embodiment of the invention (FIG. 1), a user 18 may gain access to the Internet through the public switch telephone network (PSTN) 16 and an Internet Gateway 14. Under the embodiment, the user device 18 would include a modem and computer to generate the coding sequences necessary to access the web site 22.

In another embodiment, the user uses the touch-tone buttons of his telephone 18 to gain access to the base site 22. The user enters a telephone number into the telephone 18 that dials the Internet Gateway. The Internet Gateway routes the call through the Internet accordingly.

Upon responding, the web site 22 presents options to the user using a voice synthesizer and voice plug-in at the web site 22 and presents a number in association with the option. A second voice plug-in located within the Internet Gateway 14 converts the internet messages back to audio. The user selects an option by using the touch-tone buttons on his telephone 18 to select an option.

Where the user needs help, the user selects the help option. The call is, in turn, transferred to an agent 34, 38 based upon the criteria discussed above.

A specific embodiment of a method and apparatus of providing an audio interconnect and automatic call distributor on the Internet according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of establishing an audio call path between an Internet user accessing a web site through the Internet and an agent of a plurality of agents associated with the web site, such method comprising the steps of:

providing the web site with a plurality of audio access icons each disposed on a respective web page of the web site;

detecting activation of an audio access icon of the plurality of icons by the Internet user as a help request;

searching for an agent of the plurality of agents in a context where a terminal of the agent functions as a web site and where the activated audio-access icon functions as an additional search term used along with an information content of the web page of the activated audio access icon to determine a type of question associated with the detected activation;

selecting an agent of the plurality of agents with a best relative ability to answer the determined type of question based upon the search; and establishing a voice path through the Internet using IP telephony between Internet voice plug-ins of the user and the selected agent.

2. The method as in claim 1 further comprising providing a plurality of informational web pages for access by the user.

3. The method as in claim 2 further comprising disposing an audio access icon of the plurality of audio access icons on at least some web pages of the plurality of informational web pages.

4. The method as in claim 1 wherein the step of selecting an agent further comprises correlating a training level of each agent of the plurality of agents with the subject matter of each audio-access icon.

5. The method as in claim 1 wherein the step of establishing a call path between the user and the selected agent further comprises placing an Internet address of the user in a call queue of the selected agent until the selected agent becomes available.

6. The method as in claim 1 wherein the step of establishing an call path between the user and the agent of the plurality of agents based upon activation of a audio-access icon further comprises placing the user in a call queue of the plurality of agents until a next available agent becomes available.

7. The method as in claim 6 further comprising comparing the measured time with a threshold value and overflowing the user to a queue of another agent of the plurality of agents when the measured time exceeds the threshold.

8. The method as in claim 1 wherein the determination of the type of question further comprises detecting entry of information through a previously visited webpage.

9. The method as in claim 1 wherein the step of establishing a call path between the user and the agent of the plurality of agents based upon activation of the audio-access icon further comprises transferring an Internet address of the selected agent to the user.

10. The method as in claim 1 wherein the step of establishing a call path between the user and the agent of the plurality of agents based upon activation of the audio-access icon further comprises transferring an Internet address of the user to the selected agent.

11. The method as in claim 9 wherein the step of establishing an call path between the user and the agent of the plurality of agents based upon activation of a audio-access icon further comprises transferring an Internet address of the user to the selected agent.

12. The method as in claim 1 further comprising collecting information from the user by a web site controller.

13. The method as in claim 12 wherein the step of collecting information from the user further comprises the web site controller decoding a web access request to recover a user Internet address.

14. The method as in claim 12 wherein the step of collecting information from the user further comprises the web site controller opening a web page information entry window for receipt of information from the user.

15. The method as in claim 12 further comprising transferring the collected information from the user and an identifier of the selected agent of the plurality of agents to a database of the web site.

16. The method as in claim 12 further comprising transferring the collected information and an identifier of the selected agent to a database of the web site and plurality of agents.

17. The method as in claim 16 further comprising retrieving customer records of the user from the database.

18. A method of servicing an inquiry from a user through the Internet, such method comprising the steps of:

providing a web site with a plurality of audio access icons and at least some web pages with an audio access icon of the plurality of audio access icons associated with each web page of the at least some web pages;

associating an agent group with a subject matter of each audio-access icon of each of the at least some web pages;

detecting an activation of an audio-access icon of the plurality of icons by the user as a help request;

searching for an agent of the agent groups in a context where a terminal of the agent functions as a web site and where the activated audio-access icon functions as an additional search term used along with the subject matter of the activated audio access icon to determine a type of question associated with the detected activation;

selecting an agent with a best relative ability to address the determined type of question based upon the search; and providing an call path through the Internet using IP telephony between Internet voice plug-ins of the user and the selected agent of the associated agent group.

19. A method of servicing an inquiry from a user through the Internet, such method comprising the steps of:

providing a web site with a plurality of web pages for access by the user;

providing an audio-access icon on at least some web pages of the web site;

associating an agent group with the at least some web pages;

detecting activation by the user of an audio access icon provided on the at least some web pages as a help request;

searching for an agent of the agent groups in a context where a terminal of the agent functions as a web site and where the activated audio-access icon functions as an additional search term used along with information content of the web page of the activated audio access icon to determine a type of question associated with the detected activation;

selecting an agent with a best relative ability to address the determined type of question based upon the search; and providing an call path through the Internet using IP telephony between Internet voice plug-ins of the user and the selected agent of the associated agent group.

20. Apparatus for establishing an audio call path between an Internet user accessing a web site through the Internet and an agent of a plurality of agents associated with the web site, such apparatus comprising:

means for providing a web site with a plurality of audio access icons each disposed on a respective web page of the web site;

means for detecting activation of an audio access icon of the plurality of icons by the Internet user as a help request;

means for searching for an agent of the plurality of agents in a context where a terminal of the agent functions as a web site and where the activated audio-access icon functions as an additional search term used along with information content of the web page of the activated audio access icon to determine a type of question associated with the activated activation;

means for selecting an agent with a best relative ability to address the determined type of question based upon the search; and means for establishing a call path through the Internet using IP telephony between Internet voice plug-ins of the user and the selected agent of the plurality of agents.

21. The apparatus as in claim 20 further comprising means for providing a plurality of informational web pages for access by the user.

22. The apparatus as in claim 21 further comprising means for disposing an audio access icon of the plurality of audio access icons on at least some web pages of the plurality of information web pages.

23. The apparatus as in claim 22 wherein the means for selecting an agent further comprises means for correlating a training level of each agent of the plurality of agents with the subject matter of each audio-access icon.

24. The apparatus as in claim 20 wherein the means for establishing a call path between the user and the selected agent further comprises means for placing an Internet address of the user in a call queue of the selected agent until the selected agent becomes available.

25. The apparatus as in claim 20 further comprising means for measuring a time period that the user has been in the call queue.

26. The apparatus as in claim 25 further comprising means for comparing the measured time with a threshold value and overflowing the user to a queue of another agent of the plurality of agents when the measured time exceeds the threshold.

27. The apparatus as in claim 20 wherein the means for determining a type of question further comprises means for detecting entry of information through a previously visited webpage.

28. The apparatus as in claim 20 wherein the means for establishing a call path between the user and the agent of the plurality of agents based upon activation of the audio-access icon further comprises means for transferring an Internet address of the selected agent to the user.

29. The apparatus as in claim 20 wherein the means for establishing an call path between the user and an agent of the plurality of agents based upon activation of a audio-access icon further comprises means for transferring an Internet address of the user to the selected agent.

30. The apparatus as in claim 21 further comprising means for collecting information from the user by a web site controller.

31. The apparatus as in claim 30 wherein the means for collecting information from the user further comprises means within the web site controller for decoding a web access request to recover a user Internet address.

32. The apparatus as in claim 30 wherein the means for collecting information from the user further comprises means within the web site controller for opening a web page information entry window for receipt of information from the user.

33. The apparatus as in claim 32 wherein the means for collecting information from the user further comprises means for receiving a credit card number from the user through the web page information entry window.

34. The apparatus as in claim 30 further comprising means for transferring the collected information and an identifier of the selected agent to a database of the web site.

35. The apparatus as in claim 34 further comprising means for retrieving customer records of the user from the database.

36. The apparatus as in claim 35 further comprising means for displaying the customer records at a terminal of the selected agent.

37. Apparatus for establishing an audio call path between an Internet user accessing a web site through the Internet and an agent of a plurality of agents associated with the web site, such apparatus comprising:

a web site with a plurality of audio access icons and a plurality of agent groups;

a call distribution controller operably coupled to the web site which associates an agent group of the plurality of agent groups with a subject matter of each audio-access icon of the web site;

an audio access icon of the plurality of icons that is activated by the Internet user as a help request;

a web application that searches for an agent of the plurality of agent groups in the context where a terminal of the agent functions as a web site and where the activated audio-access icon functions as an additional search term used along with information content of the respective web page of the activated audio access icon to determine a type of question associated with the activated icon;

selecting an agent of the agent group associated with the activated icon with a best relative ability to address the type of question based upon the search; and a local area network which establishes a call path through the Internet using IP telephony between Internet voice plug-ins of the user and the selected agent of the associated agent group.

38. The apparatus as in claim 37 further comprising a web site controller which provides a plurality of informational web pages for access by the user.

39. The apparatus as in claim 38 further comprising a display controller coupled to the web site controller which disposes an audio access icon of the plurality of audio access icons on at least some web pages of the plurality of informational web pages.

40. The apparatus as in claim 39 further comprising a display look-up table in a memory of the web site controller which relates an information content of each web page of the at least some web pages with the audio-access icon disposed on the web page.

41. The apparatus as in claim 40 wherein the call distribution controller which associates an agent group with each icon further comprises a call distribution look-up table which correlates a training level of an agent group of the plurality of agent groups with an information content of an audio-access icon of the at least some web pages.

42. The apparatus as in claim 37 wherein the local area network which establishes an call path between the user and an agent of the associated agent group based upon activation of a audio-access icon further comprises a setup controller which places the user in a call queue of the associated group until a next available agent becomes available.

43. The apparatus as in claim 42 further comprising a timer within the call distribution controller which measures a time period that the user has been in the call queue.

44. The apparatus as in claim 43 further comprising a comparator within the call distribution controller which compares the measured time with a threshold value and which overflows the user to a queue of another agent group when the measured time exceeds the threshold.

45. The apparatus as in claim 37 further comprising an agent activity controller which selects the agent from the associated agent group.

46. The apparatus as in claim 45 wherein the local area network which establishes an call path between the user and an agent of the associated agent group based upon activation of a audio-access icon further comprises an agent transfer controller coupled to the call distribution controller which transfers an Internet address of the selected agent to the user.

47. The apparatus as in claim 46 wherein the local area network which establishes an call path between the user and an agent of the associated agent group based upon activation of a audio-access icon further comprises a user transfer controller which transfers an Internet address of the user to the selected agent.

48. The apparatus as in claim 37 further comprising an interrogation processor which collects user information.

49. The apparatus as in claim 48 wherein the interrogation processor further comprises a packet decoder which decodes web site access requests to recover a user Internet address.

50. The apparatus as in claim 49 wherein the interrogation processor further comprises an entry window processor coupled to the web site controller for opening a web page information entry window for receipt of information from the user.

51. The apparatus as in claim 50 wherein the interrogation processor further comprises a memory coupled to the interrogation processor which stores information received from the user through the web page information entry window.

52. The apparatus as in claim 51 further comprising a database coupled to the call distribution processor for storing customer records.

53. The apparatus as in claim 52 further comprising a communications processor which transfers the information collected from the user and an identifier of the selected agent to a database of the web site.

54. The apparatus as in claim 53 further comprising a database processor coupled to the database which retrieves customer records of the user from the database based upon the information collected from the user and transferred to the database.

55. The apparatus as in claim 54 further comprising an agent terminal which displays the customer records to the selected agent.

* * * * *